United States Patent
Choi et al.

(10) Patent No.: US 8,750,189 B2
(45) Date of Patent: Jun. 10, 2014

(54) METHOD AND APPARATUS FOR TRANSMITTING OR RECEIVING SYSTEM INFORMATION IN WIRELESS COMMUNICATION SYSTEM

(75) Inventors: Jinsoo Choi, Anyang-si (KR); Hangyu Cho, Anyang-si (KR); Jinsam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 170 days.

(21) Appl. No.: 13/307,255

(22) Filed: Nov. 30, 2011

(65) Prior Publication Data

US 2012/0176975 A1    Jul. 12, 2012

Related U.S. Application Data

(60) Provisional application No. 61/430,179, filed on Jan. 6, 2011.

(51) Int. Cl.
*H04W 4/00* (2009.01)
*H04W 28/02* (2009.01)
*H04W 72/04* (2009.01)
*H04W 72/12* (2009.01)
*H04W 74/00* (2009.01)
*H04W 84/18* (2009.01)
*H04W 76/00* (2009.01)

(52) U.S. Cl.
USPC ............ 370/311; 370/329; 370/236; 370/368

(58) Field of Classification Search
CPC ............ H04W 4/005; H04W 28/0215; H04W 72/0406; H04W 72/044; H04W 72/048; H04W 72/1278; H04W 72/1284; H04W 72/1289; H04W 74/008; H04W 67/12; H04W 84/18; H04W 76/00; H04W 4/00; H04W 88/08

See application file for complete search history.

(56) References Cited

U.S. PATENT DOCUMENTS

| | | | |
|---|---|---|---|
| 7,212,819 B2 * | 5/2007 | Gallagher et al. | 455/436 |
| 7,983,254 B2 * | 7/2011 | Alt et al. | 370/389 |
| 2006/0072542 A1 * | 4/2006 | Sinnreich et al. | 370/351 |
| 2009/0197599 A1 * | 8/2009 | Cho et al. | 455/434 |
| 2009/0279506 A1 * | 11/2009 | Sinnreich et al. | 370/331 |
| 2010/0329107 A1 * | 12/2010 | Yuk et al. | 370/208 |

(Continued)

FOREIGN PATENT DOCUMENTS

WO    WO 2010049801 A1 *    5/2010

OTHER PUBLICATIONS

Hyukjin Lee; Cheng-Chew Lim; Jinho Choi, titled "Cluster-based multi-channel scheduling algorithms for ad hoc networks", presented in Wireless and Optical Communications Networks, 2007. WOCN '07. IFIP International Conference, vol., no., pp. 1, 5, Jul. 2-4, 2007, doi: 10.1109/WOCN.2007.4284161.*

(Continued)

*Primary Examiner* — Andrew Lai
*Assistant Examiner* — Hoyet H Andrews
(74) *Attorney, Agent, or Firm* — Morgan, Lewis & Bockius LLP

(57) ABSTRACT

A method for receiving system information by a User Equipment (UE) in a wireless communication system is provided. In the method, the UE receives a message including information associated with allocation of a downlink resource from a base station and receives a message including changed system information through the allocated downlink resource according to the received information associated with allocation of the downlink resource.

20 Claims, 5 Drawing Sheets

(56) References Cited

U.S. PATENT DOCUMENTS

| | | | |
|---|---|---|---|
| 2011/0051668 A1* | 3/2011 | Lee et al. | 370/328 |
| 2011/0255499 A1* | 10/2011 | Kim et al. | 370/329 |
| 2012/0263106 A1* | 10/2012 | Lee et al. | 370/328 |
| 2013/0010593 A1* | 1/2013 | Cha et al. | 370/230 |
| 2013/0114601 A1* | 5/2013 | Branscomb | 370/392 |
| 2013/0182685 A1* | 7/2013 | Yu et al. | 370/336 |
| 2013/0235827 A1* | 9/2013 | Moon et al. | 370/329 |

OTHER PUBLICATIONS

Eklund, C.; Marks, Roger B.; Stanwood, K.L.; Wang, S., "IEEE standard 802.16: a technical overview of the WirelessMAN™ air interface for broadband wireless access," Communications Magazine, IEEE, vol. 40, No. 6, pp. 98, 107, Jun. 2002, doi: 10.1109/MCOM.2002.1007415.*

Yu Chen; Yuli Yang, "Cellular Based Machine to Machine Communication with Un-Peer2Peer Protocol Stack," Vehicular Technology Conference Fall (VTC 2009—Fall), 2009 IEEE 70th, vol., no., pp. 1,5, Sep. 20-23, 2009, doi: 10.1109/VETECF.2009.5378945.*

Yu Chen; Wei Wang, "Machine-to-Machine Communication in LTE-A," Vehicular Technology Conference Fall (VTC 2010—Fall), 2010 IEEE 72nd, vol., no., pp. 1,4, Sep. 6-9, 2010, doi: 10.1109/VETECF.2010.5594218.*

Hyukjin Lee; Cheng-Chew Lim; Jinho Choi, (Lee et al.), titled "Cluster-based multi-channel scheduling algorithms for ad hoc networks" (Lee hereinafter), presented in Wireless and Optical Communications Networks, 2007. WOCN '07. IFIP International Conference, vol., no., pp. 1, 5, Jul. 2-4, 2007, doi: 10.1109/WOCN.2007.4284161.*

Eklund, C.; Marks, Roger B.; Stanwood, K.L.; Wang, S., "IEEE standard 802.16: a technical overview of the WirelessMAN™ air interface for broadband wireless access," Communications Magazine, IEEE, vol. 40, No. 6, pp. 98,107, Jun. 2002, doi: 10.1109/MCOM.2002.1007415.*

Starsinic, M., "System architecture challenges in the home M2M network," Applications and Technology Conference (LISAT), 2010 Long Island Systems, vol., no., pp. 1,7, May 7-7, 2010 doi: 10.1109/LISAT.2010.5478336.*

* cited by examiner

METHOD AND APPARATUS FOR TRANSMITTING OR RECEIVING SYSTEM INFORMATION IN WIRELESS COMMUNICATION SYSTEM

This application claims the benefit of U.S. provisional application 61/430,179, filed on Jan. 6, 2011, which is hereby incorporated by reference as if fully set forth herein.

BACKGROUND OF THE INVENTION

1. Field of the Invention

The present invention relates to wireless communication, and more particularly, to a method and apparatus for transmitting or receiving system information in a wireless communication system in which Machine to Machine (M2M) communication is used.

2. Discussion of the Related Art

Although conventional communication is mostly Human to Human (H2H) communication performed between terminals of users via a base station, Machine to Machine (M2M) communication has become possible along with development of communication technology. The term "M2M communication" refers to communication that is performed between electronic devices as the term states. Although, in a broad sense, the term "M2M communication" refers to wired or wireless communication between electronic devices or communication between a device that is controlled by a human and a machine, the term has been generally used recently to indicate wireless communication between electronic devices, i.e., wireless communication between devices.

In the early 1990's when the M2M communication concept was introduced, M2M was considered a concept such as remote control or telematics and associated markets were greatly limited. However, in recent years, M2M communication has been continuously rapidly developed to create a new market that is attracting domestic and global attention. Especially, M2M communication has exerted a great influence upon fields such as Point Of Sale (POS) and fleet management in the security-related application market and a smart meter for automatically measuring the amount of consumed heat or electricity, measuring an operating time of construction equipment and facilities, and remote monitoring machines and facilities. In the future, M2M communication will be used for a wider variety of purposes, in combination with existing mobile communication and wireless high-speed Internet or low-power communication solutions such as Wi-FI and ZigBee, and will no longer be limited to the B2B market and will expand its application field into a B2C market.

In the M2M communication era, all machines equipped with a SIM card can transmit and receive data such that it is possible to remotely manage and control all such machines. For example, the field of application of M2M communication technology is greatly broad such that M2M communication technology can be used for a great number of devices and equipment such as cars, trucks, trains, containers, vending machines, and gas tanks.

The power consumption problem is very important for the M2M device due to the characteristics of the M2M device. Thus, the M2M device reports to the base station in a long-term manner or is triggered by an event to report to the base station. That is, while the M2M device mostly remains in an idle state, the M2M device is awoken into an active state at intervals of a long-term period or when an event has occurred. Accordingly, problems such as unnecessary signaling overhead and power consumption may occur if a system information transmission and reception method, which has been applied to conventional User Equipment (UE), i.e., H2H devices, is directly applied to the M2M device.

However, no studies have been conducted on a method of receiving system information by the M2M device which has different characteristics from the conventional User Equipment (UE) or a method for transmitting system information of the M2M device.

SUMMARY OF THE INVENTION

Accordingly, the present invention is directed to a method and apparatus for transmitting or receiving system information in a wireless communication system that substantially obviates one or more problems due to limitations and disadvantages of the related art.

An object of the present invention is to provide a method and apparatus for transmitting or receiving system information in a wireless communication system, which can efficiently support M2M devices while minimizing the influence of a system information transmission and reception procedure for conventional User Equipment (UE), i.e., H2H devices, in the wireless communication system.

Objects of the present invention are not limited to those described above and other objects will be clearly understood by those skilled in the art from the following description.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for receiving system information by a User Equipment (UE) in a wireless communication system includes receiving a message including information associated with allocation of a downlink resource from a base station, and receiving a message including changed system information through the allocated downlink resource according to the received information associated with allocation of the downlink resource.

In another aspect of the present invention, an apparatus for receiving system information in a wireless communication system includes a transmitter, a receiver, and a processor configured to control the receiver to receive a message including information associated with allocation of a downlink resource from a base station and to receive a message including changed system information through the allocated downlink resource according to the received information associated with allocation of the downlink resource.

In another aspect of the present invention, a method for transmitting system information by a base station in a wireless communication system includes allocating a downlink resource and transmitting a message including information associated with the allocated downlink resource to a User Equipment (UE), and transmitting a message including changed system information through the allocated downlink resource.

In another aspect of the present invention, an apparatus for transmitting system information in a wireless communication system includes a transmitter, a receiver, and a processor configured to allocate a downlink resource and configured to control the transmitter to transmit a message including information associated with the allocated downlink resource to a User. Equipment (UE) and to transmit a message including changed system information through the allocated downlink resource.

In addition, a count value included in the message including the information associated with allocation of the downlink resource and a count value stored in the User Equipment (UE) may be compared and whether or not the system information has changed may then be determined.

Also, negative-acknowledgement (NACK) information may be transmitted to the base station and the changed system information may again be received from the base station, if the UE fails to receive the message including the changed system information.

The message including the changed system information may be an Uplink Channel Description (UCD) message or a Downlink Channel Description (DCD) message.

The message including the information associated with allocation of the downlink resource may be a downlink MAP message.

The system information may be transmitted by unicast.

According to embodiments of the present invention, it is possible to efficiently use M2M devices by removing unnecessary signaling overhead and power consumption while minimizing the influence upon conventional user equipments in a wireless communication system.

Advantages of the present invention are not limited to those described above and other advantages will be clearly understood by those skilled in the art from the following description.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following descriptions will be given in detail with reference to the case in which the wireless communication system is an IEEE 802.16 system, the following descriptions, except descriptions specific to IEEE 802.16, may be applied to any other wireless communication system (for example, an LTE/LTE-A system).

In some instances, known structures and devices are omitted or shown in block diagram form, focusing on important features of the structures and devices, so as not to obscure the concept of the present invention. The same reference numbers will be used throughout this specification to refer to the same or like parts.

In the following description, the term "User Equipment (UE)" is used to generally describe any mobile or stationary user device such as a Mobile Station (MS), or an Advanced Mobile Station (AMS). In addition, the term "base station" is used to generally describe any network node that communicates with the terminal such as a Node B, an eNode B, or an Access Point (AP).

In a wireless communication system, a User Equipment can receive information through downlink from a base station and can transmit information through uplink. Information transmitted or received by the user equipment includes data and various control information and various physical channels are provided according to the type or usage of the information transmitted or received by the User Equipment.

Figure 1:
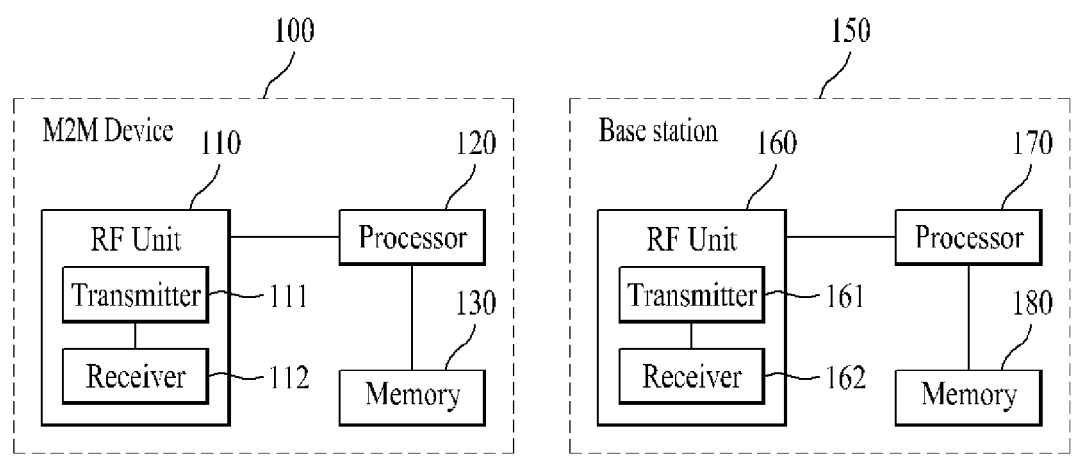
FIG. 1 illustrates a configuration of an M2M device and a base station according to an embodiment of the present invention.

FIG. 1 illustrates a configuration of an M2M device and a base station according to an embodiment of the present invention.

As shown in FIG. 1, the M2M device 100 and the base station 150 may include RF units 110 and 160, processors 120 and 170, and memories 130 and 180, respectively. The RF units 110 and 160 may include transmitters 111 and 161 and receivers 112 and 162, respectively. The transmitter 111 and the receiver 112 of the M2M device 100 may be configured so as to transmit and receive signals to and from the base station 150 and other M2M devices and the processor 120 may be functionally connected to the transmitter 111 and the receiver 112 so as to control processes which the transmitter 111 and the receiver 112 perform to transmit and receive signals to and from other devices. The processor 120 may transmit a signal to the transmitter 111 after performing a variety of processes upon the signal and may process a signal received by the receiver 112. When needed, the processor 120 may store information included in an exchanged message in the memory 130. Using such a structure, the M2M device 100 can perform methods according to various embodiments described below.

Although not illustrated in FIG. 1, the M2M device 100 may include various additional components according to the type of application. When the M2M device 100 is an M2M device for smart measurement, the M2M device 100 may include an additional component for power measurement or the like and such a power measurement operation may be controlled by the processor 120 shown in FIG. 1 or by a separate processor (not shown).

Although FIG. 1 illustrates the case in which communication is performed between the M2M device 100 and the base station 150, M2M communication methods according to the present invention may be performed between M2M devices and each of the devices may have the same configuration as that shown in FIG. 1 and perform methods according to various embodiments described below.

The transmitter 161 and the receiver 162 of the base station 150 may be configured so as to transmit and receive signals to and from another base station, an M2M server, and M2M devices and the processor 170 may be functionally connected to the transmitter 161 and the receiver 162 so as to control processes which the transmitter 161 and the receiver 162 perform to transmit and receive signals to and from other devices. The processor 170 may transmit a signal to the transmitter 161 after performing a variety of processes upon the signal and may process a signal received by the receiver 162. When needed, the processor 170 may store information included in an exchanged message in the memory 180. Using such a structure, the base station 150 can perform methods according to various embodiments described below.

The processors 120 and 170 of the RF unit 110 and the base station 150 instruct (for example, control, adjust, or manage) operations of the RF unit 110 and the base station 150, respectively. The processors 120 and 170 may be connected to the memories 130 and 180 that store program code and data. The memories 130 and 180 are connected to the processors 120 and 170 and store operating systems, applications, and general files, respectively.

Each of the processors 120 and 170 may also be referred to as a controller, a microcontroller, a microprocessor, or a microcomputer. Each of the processors 120 and 170 may be implemented by hardware, firmware, software, or any combination thereof. In the case in which the embodiments of the present invention are implemented by hardware, the processors 120 and 170 may include application specific integrated circuits (ASICs), digital signal processors (DSPs), digital signal processing devices (DSPDs), programmable logic devices (PLDs), field programmable gate arrays (FPGAs), processors, controllers, microprocessors, or the like.

In the case in which the embodiments of the present invention are implemented by firmware or software, the firmware or software may be configured so as to include modules, processes, functions, or the like which perform the features or operations of the present invention and the firmware or software configured so as to implement the present invention may be provided in the processors 120 and 170 or may be stored in the memories 130 and 180 so as to be executed by the processors 120 and 170.

Such a device that communicates in an M2M manner as described above can be referred to as an M2M device, an M2M communication device, or a Machine Type Communication (MTC) device. On the other hand, a conventional User Equipment may be referred to as a Human Type Communication (HTC) terminal or a Human to Human (H2H) device.

The number of M2M devices in a network will gradually increase as the number of machine application types increases. Such machine application types that are under discussion include, but are not limited to, (1) security, (2) public safety, (3) tracking and tracing, (4) payment, (5) healthcare, (6) remote maintenance and control, (7) metering, (8) consumer devices, (9) Point Of Sale (POS) and fleet management in the security-related application market, (10) communication between vending machines, (11) a smart meter for automatically measuring the amount of consumed heat or electricity, measuring an operating time of construction equipment and facilities, and remote monitoring machines and facilities, and (12) surveillance video communication of a surveillance camera, and various other machine application types are also under discussion. As the number of machine application types increases, the number of M2M devices will significantly increase compared to the number of conventional User Equipments, i.e., H2H devices.

As described above, the M2M device is characterized in that it transmits data to a base station in a long term manner or is triggered by an event to transmit data. That is, while the M2M device mostly remains in an idle state, the M2M device may be awoken into an active state at intervals of a long-term period or when an event has occurred.

The system information transmission and update procedure applied to conventional User Equipments (H2H devices) may be inefficient due to such characteristics.

Figure 2:
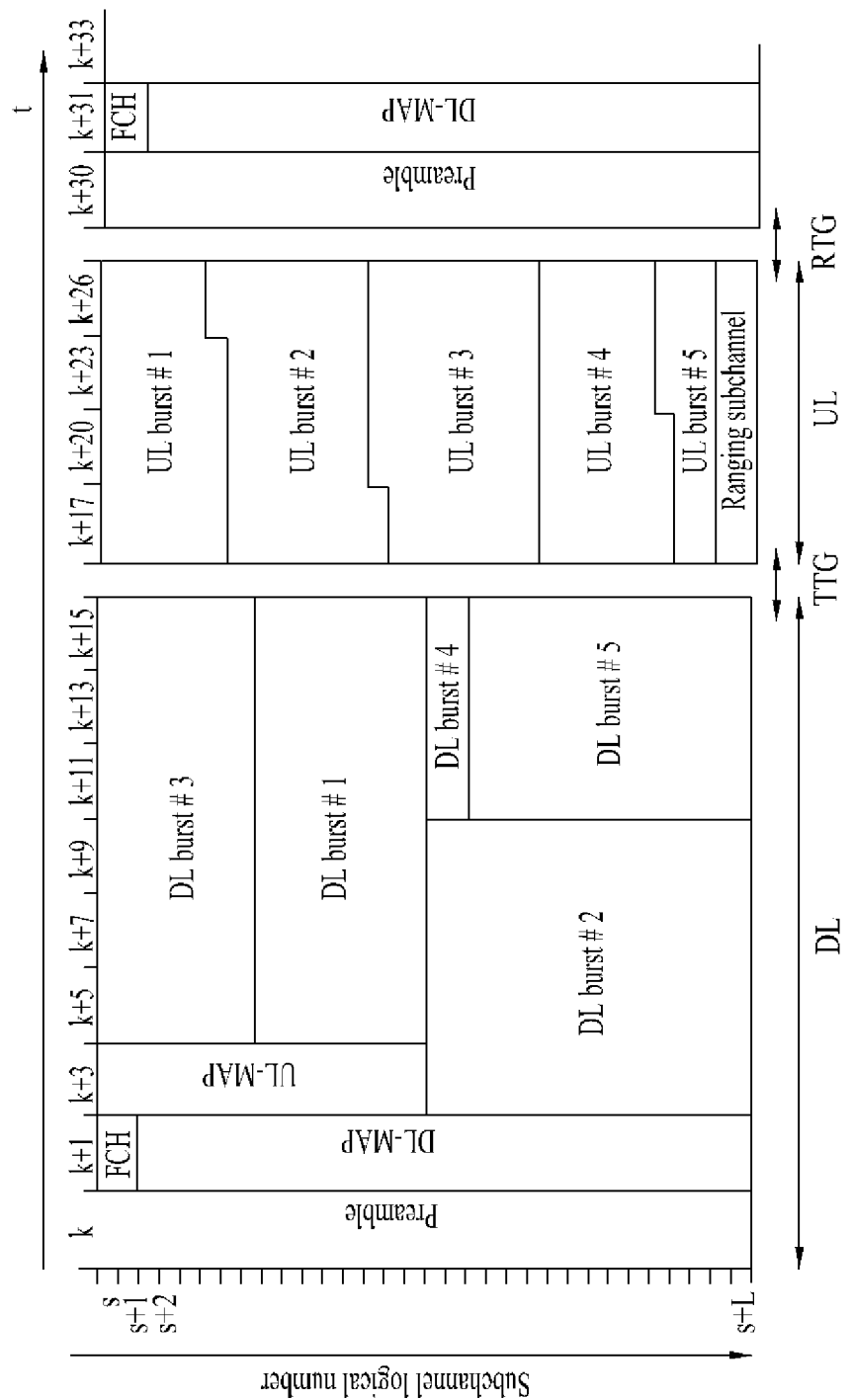
FIG. 2 illustrates a frame structure of an IEEE 802.16e system which is an example of a wireless communication system.

FIG. 2 illustrates a frame structure of an IEEE 802.16e system which is an example of the wireless communication system.

As shown in FIG. 2, a frame structure may be defined by a preamble, a frame control header (FCH), a DL/UL-MAP, and a burst. A frame is a data sequence channel having a predetermined duration according to physical characteristics and includes DL and UL subframes.

A preamble is specific sequence data located at the first symbol of each frame and is used for a user equipment to achieve synchronization with a base station or to perform channel estimation. The FCH is used to provide channel code information and channel allocation information associated with a DL-MAP. The DL-MAP/UL-MAP notifies a user equipment of DL/UL resource allocation. The burst is a data unit that is transmitted or received by one User Equipment. The burst may be discriminated according to whether it is downlink data or uplink data and may be transmitted in a frame at intervals of a predetermined frame interval. The size and position of the burst may be signaled through a DL-MAP/UL-MAP.

The following Tables 1 and 2 illustrate an exemplary DL-MAP message and a UL-MAP message, respectively.

TABLE 1

| Syntax | Size (bit) | Notes |
|---|---|---|
| DL-MAP_Message_Format( ) { | — | — |
|   Management Message Type = 2 | 8 | — |
|   PHY Synchronization Field | variable | See appropriate PHY specification. |
|   DCD Count | 8 | — |
|   Base Station ID | 48 | — |
|   Begin PHY-specific section { | — | See applicable PHY subclause. |
|     if (WirelessMAN-OFDMA) { | — | — |
|       No. OFDMA symbols | 8 | For TDD. the number of OFDMA symbols in the DL subframe including all AAS/permutation zone and including the preamble. For FDD. see 8.4.4.2.2. |
|     } | — | — |
|     for (i = 1: i <= n: i++) { | — | For each DL-MAP element 1 to n. |
|       DL-MAP_IE( ) | variable | See corresponding PHY specification. |
|     } | — | — |
|   } | — | — |
|   if !(byte boundary) { | — | — |
|     Padding Nibble | 4 | Padding to reach byte boundary. |
|   } | — | — |
| } | — | — |

TABLE 2

| Syntax | Size (Bit) | Notes |
|---|---|---|
| UL-MAP_Message_Format( ) { | — | — |
|   Management Message Type = 3 | 8 | — |
|   FDD Partition Change Flag | 1 | For FDD only. Indicates the next possible partition change. 0b0:Possible partition change in next frame 0b1:Minimum number of frames (excluding current frame) before next possible change is given by TLV 'FDD frame partition change timer' |
|   Reserved | 7 | Shall be set to zero. |
|   UCD Count | 8 | — |
|   Allocation Start Time | 32 | — |
|   Begin PHY-specific section { | — | See applicable PHY subclause. |
|     if (WirelessMAN-OFDMA) { | — | — |
|       No. OFDMA symbols | 8 | For TDD, the number of OFDMA symbols in the UL subframe For FDD. see 8.4.4.2.2 |
|     } | — | — |
|     for (i = 1: i <= n: i++) { | — | For each UL-MAP element 1 to n. |
|       UL-MAP_IE( ) | variable | See corresponding PHY specification. |
|     } | — | — |
|   } | — | — |
|   if !(byte boundary) { | — | — |
|     Padding Nibble | 4 | Padding to reach byte boundary. |
|   } | — | — |
| } | — | — |

As described above, the DL-MAP/UL-MAP message defines the usage and position of a burst allocated to DL/UL sections (or intervals). In the case of a DL-MAP Information Element (IE), a corresponding downlink traffic section of the User Equipment is discriminated by a Downlink Interval Usage Code (DIUC), a Connection ID (CID), and burst position information (for example, a subchannel offset, a symbol offset, the number of subchannels, and the number of symbols). The usage of a UL-MAP IE is determined by an Uplink Interval Usage Code (UIUC) for each Connection ID (CID) and the position of a corresponding section is defined by the duration. Here, the usage of each section is determined by the UIUC used in the UL-MAP and each section starts from a position which is away from the start point of a previous UL-MAP IE by a duration defined in the UL-MAP IE.

A Downlink Channel Description (DCD) message and an Uplink Channel Description (UCD) message include system information of the base station (for example, uplink/downlink channel parameters) and are transmitted from the base station to User Equipments in a broadcasting manner at intervals of a predetermined period. The User Equipments acquire information associated with a coding and modulation scheme of each burst from the DCD/UCD messages and perform data coding/decoding using the acquired information. Each User Equipment receives DCD/UCD messages that are transmitted at regular intervals and determines whether or not system information of the base station (for example, channel parameters) has changed and updates the system information with the changed system information through the DCD/UCD messages. A CDMA code set associated with ranging and bandwidth requests, a backoff time that is applied upon collision after code transmission of the User Equipment, and the like, in addition to profile information associated with a coding and modulation scheme of an uplink burst, are defined in the UCD message. The following Table 3 illustrates an example of the DCD message.

TABLE 3

| Syntax | Size (bit) | Notes |
|---|---|---|
| DCD_Message_Format( ) { | — | — |
|   Management Message Type = 1 | 8 | — |
|   Reserved | 8 | Shall be set to zero |
|   Configuration Change Count | 8 | — |
|   TLV Encoded information for the overall channel | variable | TLV-specific |
|   Begin PHY-specific section { | — | See applicable PHY subclause |
|     for (i = 1: i <= n: i++) { | — | For each DL burst profile 1 to n |
|       Downlink_Burst_Profile | — | PHY-specific |
|     } | — | — |
|   } | — | — |
| } | — | — |

In the OFDMA scheme, the User Equipment performs an uplink bandwidth request and a ranging request for adjusting uplink transmission parameters using a CDMA code. The base station delivers CDMA codes for ranging and bandwidth requests to User Equipments through a UCD message in a broadcasting manner and each User Equipment arbitrarily selects a ranging code suitable for the purpose from among the CDMA codes acquired from the UCD message and transmits the ranging code through an uplink channel allocated for ranging. The following Table 4 illustrates an example of the UCD message.

TABLE 4

| Syntax | Size (bit) | Notes |
|---|---|---|
| UCD_Message_Format( ) { | — | — |
|   Management Message Type = 0 | 8 | — |
|   Configuration Change Count | 8 | — |
|   Ranging Backoff Start | 8 | — |
|   Ranging Backoff End | 8 | — |
|   Request Backoff Start | 8 | — |
|   Request Backoff End | 8 | — |
|   TLV Encoded information for the overall channel | variable | TLV-specific. |
|   Begin PHY-specific section { | — | See applicable PHY subclause. |
|     for (i = 1: i <= n: i++) { | — | For each UL burst profile 1 to n. |
|       Uplink_Burst_Profile | variable | PHY-specific. |
|     } | — | — |
|   } | — | — |
| } | — | — |

Figure 3:
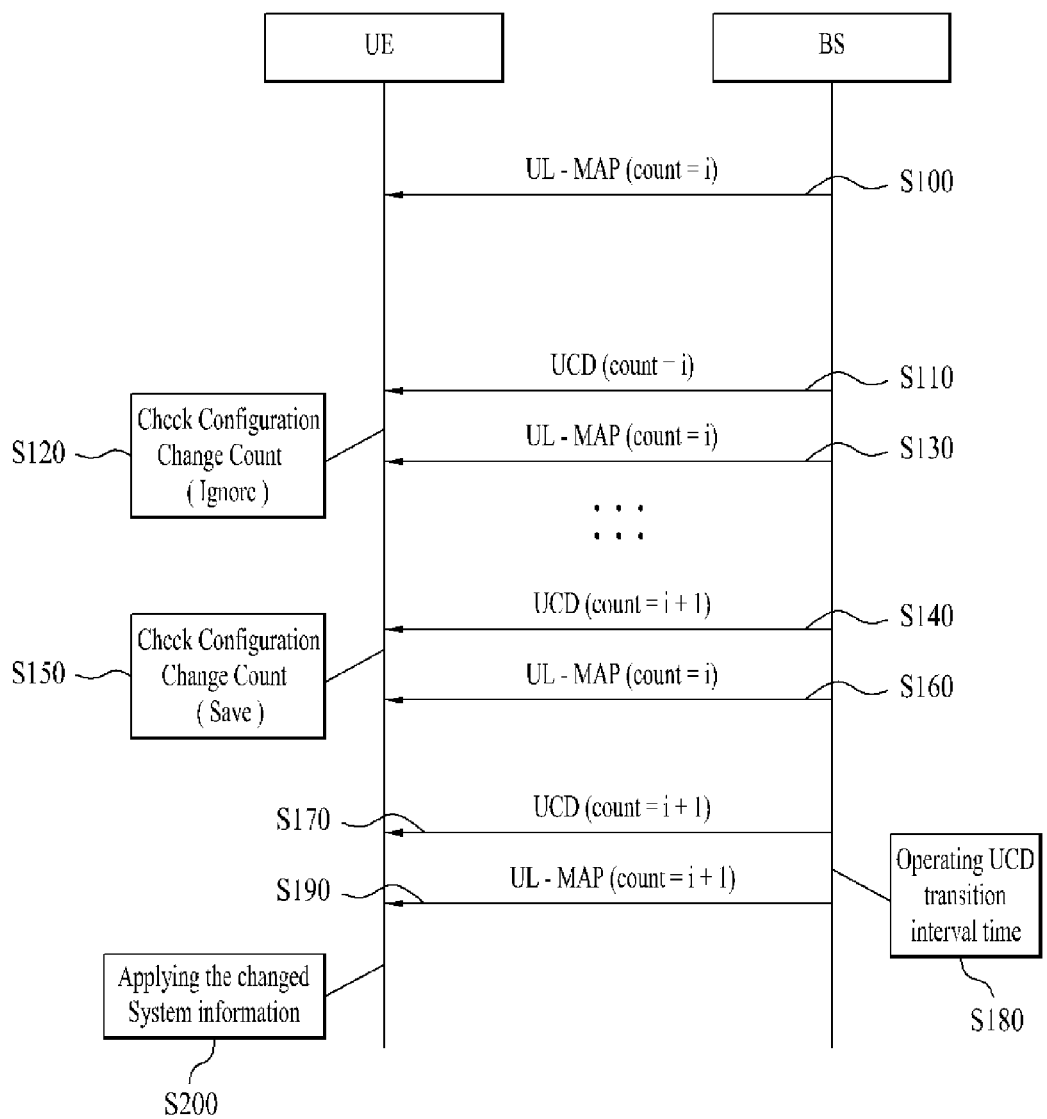
FIG. 3 illustrates a procedure for updating system information in a UCD message in an IEEE 802.16e system which is an example of a wireless communication system.

FIG. 3 illustrates a procedure for updating system information in a UCD message in an IEEE 802.16e system which is an example of the wireless communication system. Although FIG. 3 illustrates a procedure for updating system information in a UCD message, a procedure for updating system information in a DCD message may be performed in the same manner.

A base station transmits a UL-MAP message whose UCD count is i at intervals of a specific period (S100). The base station transmits a UCD message whose configuration change count is i (S110). When a User Equipment has received the UCD message, the User Equipment decodes the UCD message and then compares a configuration change count i stored in the User Equipment with the configuration change count i included in the received UCD message and ignores system information in the received UCD message if the two configuration change counts are equal (S120). The base station repeatedly transmits a UL-MAP message whose UCD count is i at intervals of the specific period (S130).

If the system information has changed, the base station transmits a 'UCD message whose configuration change count is i+1 (S140). Here, the UCD message includes the changed system information.

Upon receiving the UCD message whose configuration change count is i+1, the User Equipment decodes the UCD message and then compares the configuration change count i stored in the User Equipment with the configuration change count i+1 included in the received UCD message and stores the changed system information included in the received UCD message if the two configuration change counts are different (S150). The base station repeatedly transmits a UL-MAP message whose UCD count is i at intervals of the specific period (S160).

The base station retransmits the UCD message whose configuration change count is i+1 (S170) and activates a UCD transition interval timer (S180). When the timer expires, the base station transmits a UL-MAP message whose UCD count is i+1 (S190). Upon receiving the UL-MAP message whose UCD count is i+1, the User Equipment deletes the existing system information and applies changed system information (S200).

A number of steps are performed until the User Equipment applies the system information and the time required to apply the system information is also long. In the case in which the User Equipment has failed to receive a UCD/DCD message, it is not possible to apply the changed system information and therefore it may be difficult to transmit and receive data or the like until a next UCD/DCD message is received.

On the other hand, as described above, the M2M device needs to receive a DCD/UCD message including changed system information in a listening interval or an available interval subsequent to an unavailable interval or a sleep interval for power saving. However, the M2M device may have various operation cycles (for example, various sleep/listening intervals or available/unavailable intervals) according to application type. Therefore, it is not possible to adjust transmission of a DCD/UCD message in order to update system information for every M2M device.

In addition, if the M2M device fails to decode a DCD/UCD message or if the base station does not transmit a DCD/UCD message even in the case in which the base station has transmitted a control information element indicating transmission of the DCD/UCD message for the M2M device and the M2M has then received the control information element, it is not possible to provide feedback to the control information element and therefore the M2M device needs to perform a procedure for decoding all frames until a DCD/UCD message including changed system information is received. This causes power loss of the M2M device.

Especially when the M2M device has a very long sleep interval or unavailable interval and needs to be awoken within a short listening interval or available interval, there is such a power loss problem and it also takes a very long time until changed system information is applied.

The system information update procedure applied to conventional User Equipments (H2H devices) may be inefficient for the M2M device due to such characteristics. Thus, there is a need to partially change the system information transmission and update procedures applied to conventional User Equipments (H2H devices) within a range in which the procedures are not significantly changed.

Figure 4:
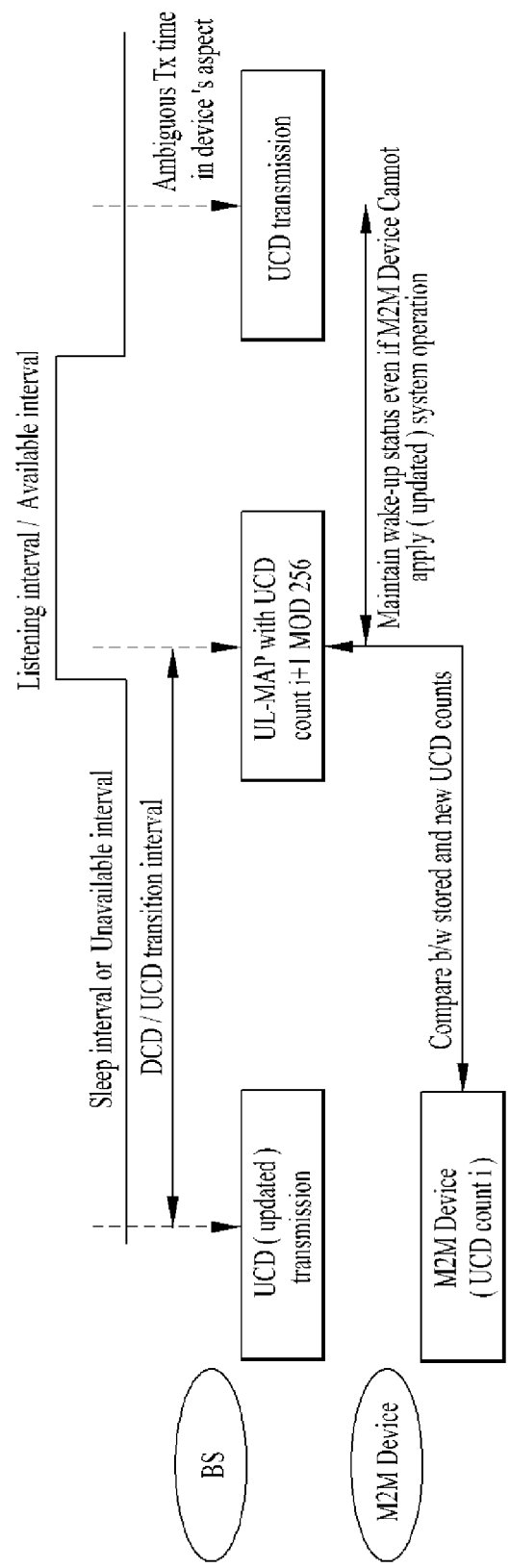
FIG. 4 illustrates an example in which a system information update procedure applied to conventional user equipment is applied to an M2M device.

FIG. 4 illustrates an example in which the system information update procedure applied to conventional User Equipments is applied to an M2M device. As shown in FIG. 4, when system information has changed in a sleep interval or an unavailable interval of an M2M device, a base station transmits a UCD message including the changed system information in an interval in which the M2M device cannot receive a UCD message. Thereafter, when the M2M device has received a UL-MAP message having a UCD count of i+1 in a listening interval or an available interval, the M2M device compares a configuration change count stored in the M2M device with the UCD count of the received UL-MAP message. Since the configuration change count stored in the M2M device is different from the UCD count value in the received UL-MAP message, the M2M device can confirm that the system information has changed. However, the M2M device cannot update the system information since the M2M device has not received a UCD message including the changed system information. Accordingly, the M2M device cannot decode the received UL-MAP message and therefore it may not be possible to transmit or receive data or the like transmitted thereafter. In addition, although it is not possible to transmit or receive data or the like, the M2M device may remain in an awoken state in a listening interval or an available interval, thereby causing a waste of power.

Figure 5:
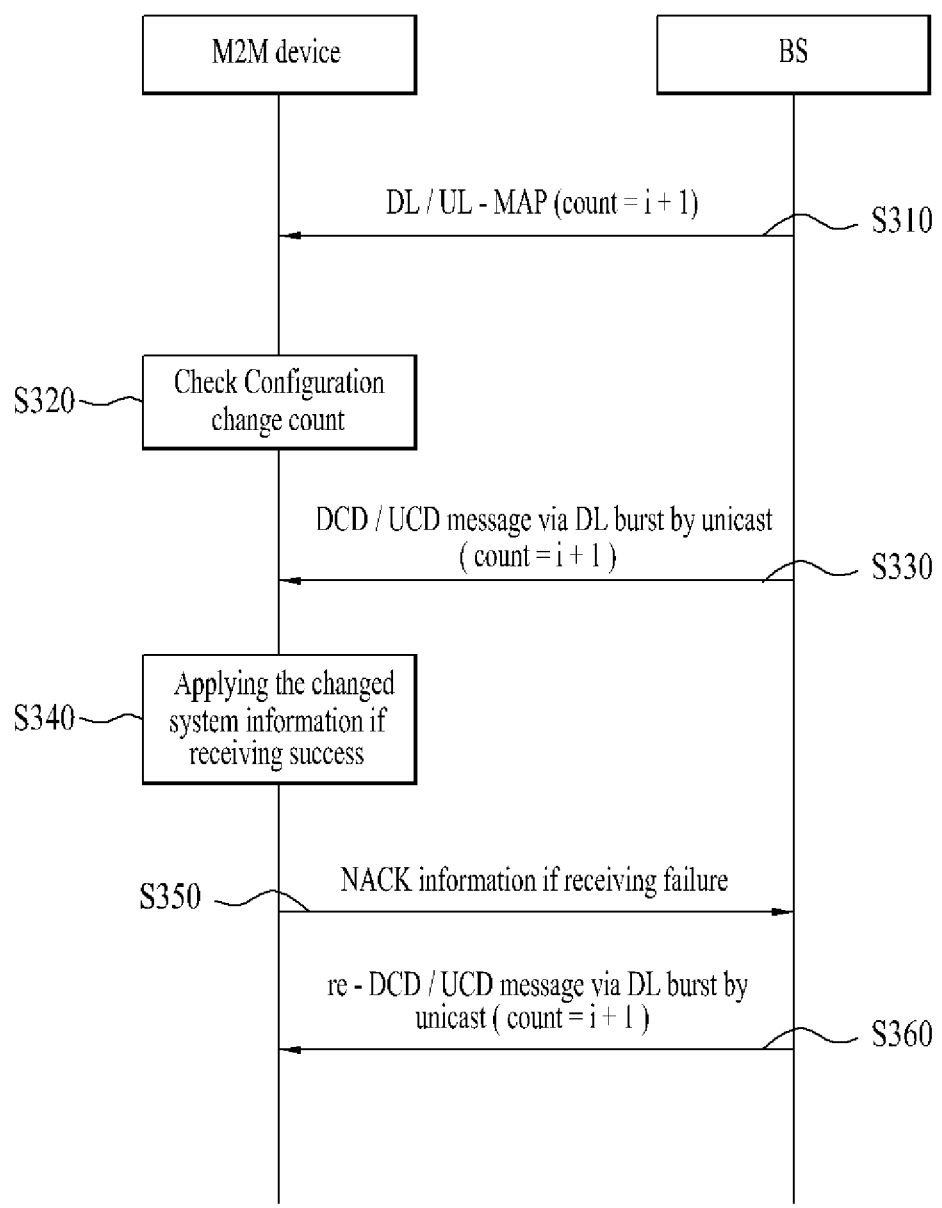
FIG. 5 illustrates a procedure for updating system information in an M2M device according to an embodiment of the present invention.

FIG. 5 illustrates a procedure for updating system information in an M2M device according to an embodiment of the present invention. Although this embodiment will be described with reference to a procedure for updating system information in a DCD/UCD message as an example, the present invention is not limited to this example and the same method may be applied to a variety of system information update procedures including a procedure for updating system information in an AAI-SCD message.

First, let us assume that system information has changed in a sleep interval or an unavailable interval of an M2M device and, although a base station has transmitted a DCD/UCD message which has a configuration change count of i+1 and includes the changed system information, the M2M device has failed to receive the DCD/UCD message since the M2M device operates in an idle mode or a sleep mode. Of course, the present invention is not limited to this assumption.

As shown in FIG. 5, the base station transmits a DL/UL-MAP message whose DCD/UCD count is i+1 in a listening interval or an available interval of the M2M device (S310). The transmitted DL/UL-MAP message indicates a DL/UL burst for transmitting a DCD/UCD message including the changed system information having the configuration change count i+1 rather than a DL/UL burst for traffic transmission. The transmitted DL/UL-MAP message may correspond to a DL/UL-MAP message that is first transmitted in the corresponding listening interval or available interval.

The M2M device compares the DCD/UCD count in the received DL/UL-MAP message and a configuration change count value stored in the M2M device (S320). When the DCD/UCD count and the configuration change count value are equal, the M2M device may determine that system information has not changed.

However, when the DCD/UCD count and the configuration change count value are different, the M2M device may determine that system information has changed and then receive a DCD/UCD message including the changed system information through a DL burst indicated by the DL-MAP message (S330). Here, the DL burst may correspond to a DL burst that has been scheduled for first data transmission in a corresponding listening interval or available interval. That is, when a listening interval or available interval of the M2M device starts, the base station may transmit a DCD/UCD message including changed system information rather than data in a DL burst that has been scheduled for first data transmission. The M2M device may identify and receive the changed DCD/UCD message through the DL burst that has been scheduled for first data transmission. This allows the M2M device to receive the changed DCD/UCD message before receiving data such that it is possible to easily apply the changed system information. The DCD/UCD message, which is transmitted through the DL burst, may be transmitted by unicast.

When the M2M device has successfully received the DCD/UCD message, the M2M device transmits acknowledgement (ACK) information and applies the changed system information included in the DCD/UCD message (S340). On the other hand, when the M2M device has failed to receive the DCD/UCD message, the M2M device may transmit negative-acknowledgement (NACK) information (S350) and the base station may retransmit the DCD/UCD message (S360). Here, the base station may retransmit a DL/UL-MAP message indicating a DL burst for DCD/UCD message transmission.

The DCD/UCD message transmitted through the DL burst may have the same format and the same information items as a DCD/UCD message applied to conventional user equipment, i.e., H2H devices. The DCD/UCD message transmitted through the DL burst may include only information essential for a specific M2M device, which is different from a DCD/UCD message applied to conventional User Equipment. For example, periodic ranging related information, sounding related information, reentry related information, and the like included in the conventional DCD/UCD message may not be included in the DCD/UCD message transmitted through the DL burst and information associated with an initial backoff window for supporting reentry of a number of M2M devices, an indicator of the situations of disaster and blackout, and the like may be added to the DCD/UCD message transmitted through the DL burst. The DCD/UCD message may be defined to be different depending on the characteristics of each M2M device.

The transmission period and transmission time of a DCD/UCD message may also be defined to be different depending on the characteristics of the M2M device. For example, a DCD/UCD message may be transmitted in a first subframe, frame, or superframe in a listening interval or an available interval. The transmission time of the DCD/UCD message may be signaled in a previous listening interval or available interval. The transmission time of the DCD/UCD message may also be signaled through a DL/UL-MAP message having an updated UCD/DCD count.

Although the embodiment of FIG. 5 has been described with reference to the case in which system information in DCD/UCD messages is simultaneously updated as an example, the same method may be applied to the case in which system information in a DCD message is updated or the case in which system information in a UCD message is updated. The base station may selectively apply the conventional system information update procedure to a conventional User Equipment, i.e., an H2H device, and apply the system information update procedure described above to an M2M device.

As is apparent from the above description, according to embodiments of the present invention, it is possible to efficiently use M2M devices by removing unnecessary signaling overhead and power consumption while minimizing the influence upon conventional user equipments in a wireless communication system.

The above embodiments are provided by combining components and features of the present invention in specific forms. The components or features of the present invention should be considered optional unless explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced within the scope of the invention.

What is claimed is:

1. A method for receiving system information by a User Equipment (UE) in a wireless communication system, the method comprising:
   receiving a message including information associated with allocation of a downlink resource with an Uplink Channel Description (UCD)/Downlink Channel Description (DCD) count from a base station;
   receiving changed system information through the allocated downlink resource when the UCD/DCD count is greater than a UCD/DCD count stored in the UE; and
   receiving a downlink data through the allocated downlink resource when the UCD/DCD count is the same as the UCD/DCD count stored in the UE,
   wherein the message is transmitted at the beginning of a listen interval of the UE.

2. The method according to claim 1, further comprising: comparing a UCD/DCD count value included in the message including the information associated with allocation of the downlink resource and a UCD/DCD count value stored in the UE and determining whether or not the system information has changed.

3. The method according to claim 1, further comprising: transmitting negative-acknowledgement (NACK) information to the base station and receiving the changed system information from the base station, if the UE fails to receive the changed system information.

4. The method according to claim 1, wherein the changed system information is included in an Uplink Channel Description (UCD) message or a Downlink Channel Description (DCD) message.

5. The method according to claim 1, wherein the message including the information associated with allocation of the downlink resource is a downlink MAP message.

6. The method according to claim 1, wherein the system information is transmitted by unicast.

7. An apparatus for receiving system information in a wireless communication system, the apparatus comprising:
   a transmitter;
   a receiver; and
   a processor configured to control the receiver to receive a message including information associated with allocation of a downlink resource with an Uplink Channel Description (UCD)/Downlink Channel Description (DCD) count from a base station and to receive changed system information through the allocated downlink resource when the UCD/DCD count is greater than a UCD/DCD count stored in the UE, and to receive a downlink data through the allocated downlink resource when the UCD/DCD count is the same as the UCD/DCD count stored in the UE, wherein the message is transmitted at the beginning of a listen interval of the UE.

8. The apparatus according to claim 7, wherein the processor is configured to compare a UCD/DCD count value included in the message including the information associated with allocation of the downlink resource and a UCD/DCD count value stored in the apparatus and determines whether or not the system information has changed.

9. The apparatus according to claim 7, wherein the processor is configured to control the transmitter to transmit negative-acknowledgement (NACK) information to the base station and configured to control the receiver to receive the changed system information from the base station, if the apparatus fails to receive the changed system information.

10. The apparatus according to claim 7, wherein the changed system information is included in an Uplink Channel Description (UCD) message or a Downlink Channel Description (DCD) message.

11. The apparatus according to claim 7, wherein the message including the information associated with allocation of the downlink resource is a downlink MAP message.

12. The apparatus according to claim 7, wherein the system information is transmitted by unicast.

13. A method for transmitting system information by a base station in a wireless communication system, the method comprising:
   allocating a downlink resource and transmitting a message including information associated with the allocated downlink resource with Uplink Channel Description (UCD)/Downlink Channel Description (DCD) count to a User Equipment (UE);
   transmitting a message including changed system information through the allocated downlink resource when the UCD/DCD count is increased; and
   transmitting a downlink data through the allocated downlink resource when the UCD/DCD count is unchanged,
   wherein the message is transmitted at beginning of listen interval of the UE.

14. The method according to claim 13, further comprising: receiving, from the UE, negative-acknowledgement (NACK) information indicating a failure of receiving the changed system information; and retransmitting the changed system information to the UE.

15. The method according to claim 13, wherein the changed system information is included in an Uplink Channel Description (UCD) message or a Downlink Channel Description (DCD) message.

16. The method according to claim 13, wherein the message including the information associated with the allocated downlink resource is a downlink MAP message.

17. An apparatus for transmitting system information in a wireless communication system, the apparatus comprising:
   a transmitter;
   a receiver; and
   a processor configured to allocate a downlink resource and configured to control the transmitter to transmit a message including information associated with the allocated downlink resource with an Uplink Channel Description (UCD)/Downlink Channel Description (DCD) count to a User Equipment (UE) and to transmit a message including changed system information through the allocated downlink resource when the UCD/DCD count is increased and to transmit a downlink data through the allocated downlink resource if the UCD/DCD count is unchanged, wherein the message is transmitted at the beginning of a listen interval of the UE.

18. The apparatus according to claim 17, wherein the processor is configured to control the receiver to receive, from the UE, negative-acknowledgement (NACK) information indicating a failure of receiving the changed system information and to control the transmitter to retransmit the changed system information to the UE.

19. The apparatus according to claim 17, wherein the changed system information is included in an Uplink Channel Description (UCD) message or a Downlink Channel Description (DCD) message.

20. The apparatus according to claim 17, wherein the message including the information associated with the allocated downlink resource is a downlink MAP message.

* * * * *